United States Patent

[11] 3,622,668

[72] Inventors Joe B. Moss
8405 Emmet, Omaha, Nebr. 68134;
Clifford F. Moss, deceased, late of Moville, Iowa by Joe B. Moss, assignee
[21] Appl. No. 857,617
[22] Filed Aug. 27, 1969
[45] Patented Nov. 23, 1971
Continuation of application Ser. No. 704,982, Feb. 2, 1968, now abandoned, which is a continuation of application Ser. No. 390,751, Aug. 19, 1964, now abandoned. This application Aug. 27, 1969, Ser. No. 857,617

[54] METHOD OF PROMOTING SCAR-FREE HEALING OF SKIN LACERATIONS
2 Claims, No Drawings

[52] U.S. Cl. .................................................... 424/237, 424/346
[51] Int. Cl. ..................................................... A61r 15/02
[50] Field of Search .......................................... 424/346, 237

[56] References Cited
OTHER REFERENCES

Dispensatory of the United States of America, 25th Ed., published by J. B. Lippincott Co., Phila., 1955, pp. 922 and 1039 copy in POSL Journal of the American Medical Association, Vol. 123, No. 3, pg. 111, Sept. 11, 1943, 167/81 Top Physicians' Desk Reference, 14th Ed., published by Medical Economics, Inc., Oradell, NJ., 1959, pg. 635

Williams et al., Archives of Surgery, Vol. 49, pg. 225, 1944 167/81 Top

*Primary Examiner*—Richard L. Huff
*Attorney*—George R. Nimmer

ABSTRACT: This invention relates to medications for and the treatment of skin lacerations. In particular, this invention relates to a novel medication that may be applied as an abluent lotion directly upon lacerated skin tissue of wounded animals so as to promote scar-free healing thereof.

METHOD OF PROMOTING SCAR-FREE HEALING OF SKIN LACERATIONS

This application is a continuation of copending application Ser. No. 704,982 filed on Feb. 2, 1968, which was a continuation of application Ser. No. 390,751 filed on Aug. 19, 1964, now both abandoned.

Generally coincident with the healing of a cut or similarly type laceration of the skin is the formation of a scar, said scar providing the victim with a more or less permanent reminder of the original laceration. It has been theorized by medical doctors and veterinarians that a scar is the result of keratoid or cornified tissue that is attendantly formed along with normal soft tissue during the laceration's healing process. It has been observed that the first step in the natural healing process is the "bridging-over" regeneration of the epidermal or thin outermost skin layer; during this relatively rapid first step there is apparently very little, if any, hard cornified tissue formed. Commencing simultaneously with but extending over a much more lengthy duration is the second and slower step, that of regenerative healing of the much thicker inner or endodermal skin layer.

During the slower healing process of the endodermal layer, successive strata of normal soft tissue are formed beginning at the cross-sectional periphery of the laceration. The stratified regeneration process proceeds until the previously healed epidermis is reached so as to complete the healing process. As each stratum of normal soft tissue in the endodermal layer is formed, there is the attendant formation of hard cornified tissue, the cornified material from the preceding strata accumulating and being pushed upwardly toward the epidermis. At the point wherein the final stratus of normal soft tissue is formed so as to complete regeneration of the endodermal layer, there is at the epidermal-endodermal interface a voluminous accumulation of the hard cornified byproduct tissue. It is generally believed that this accumulation trapped at the interface is responsible for the unsightly appearance of the ultimate scar.

It is accordingly the object of the present invention to provide an abluent medicament appropriate for animal forms of vertebrate life that will disinfect and promote healing of a laceration, while preventing the accumulation of scar-producing keratoid tissue at the epidermal-endodermal interfacial juncture of the ultimately healed laceration.

It has been found that when appropriate portions of Vitamin "A" Vitamin "D," olive oil, and a suitable aromatic hydroxyl derivative are mixed together to form a homogeneous lotion, that the lotion compounded therefrom will provide the following synergistic effect. First, the skin laceration is disinfected, Second, regenerative healing of the endodermal layer is accelerated while the healing process of the epidermal layer is temporarily suspended. Third, the keratoid or cornified tissue, but not the soft normal tissue, of the endodermal layer is dissolved or otherwise prevented from accumulating. The synergistic result of certain homogeneous mixtures of these four ingredients is to promote a rapid healing of a skin laceration, commencing at the cross-sectional periphery thereof, so as to provide scar-free characteristics in the ultimately healed skin laceration.

Among the several aromatic hydroxyl derivatives that may be employed, phenol, cresol, resorcinol, and biphenol are preferred. It is essential that each gravimetric unit of aromatic hydroxyl derivative employed be homogeneously mixed and diluted with at least 1 gravimetric units of an oleaginous material, either as the olive oil or as another oleaginous diluent, so as to prevent corrosive burning of the skin. At the other extreme, dilution of each gravimetric unit with more than about three parts oleaginous material would inhibit the antiseptic properties of the aromatic hydroxyl derivative.

If phenol is to be employed as the aromatic hydroxyl derivative, the anhydrous form thereof is preferred. However, phenol is commonly commercially available as an 88 percent solution by weight in water. The presence of water in the lotion does not impair the function thereof nor does it, in the ensuing examples, destroy the homogeneity thereof.

It is preferred that the employed ratios of Vitamin "A" to Vitamin "B," respectively, be within the range of about 8–11 to 1, based upon the appropriate U.S.P. Units of these two vitamins. A U.S.P. Unit of Vitamin "A" (Retinol) is equivalent to 0.30 micrograms. A U.S.P. Unit of Vitamin "D" (Ergosterol) is equivalent to 0.025 micrograms. For every 100 grams of aromatic hydroxyl derivative, at least 80,000 U.S.P. Units of Vitamin "A" should be employed in the abluent medicament.

The following Examples illustrate several specific formulations that may be employed for the abluent medicament of the present invention. Formulations are presented in the weight units listed.

EXAMPLE 1

| | |
|---|---|
| Phenol (Anhydrous) | 100.0 grams |
| Olive Oil, U.S.P. | 114.0 grams |
| Retinol (Vitamin A) | 92,000 U.S.P. Units |
| Ergosterol (Vitamin D) | 9,200 U.S.P. Units |
| Oleaginous diluent as linseed oil | 80.0 grams |

The above ingredients are mixed together to provide a homogeneous lotion. Chemical analysis of the U.S.P. Olive Oil disclosed: 10 percent palmitic acid, 2 percent stearic acid, 8 percent linoleic acid, and 80 percent oleic acid as glycerides.

The homogeneous lotion is utilized as an abluent medicament in the following manner. The lotion is applied daily with a chicken feather onto the lacerated flank of a horse. While the the lacerated wound may be covered with a protective bandage, the skin is not drawn tightly together so as to close the gash. It is essential that the laceration, during the healing process, be left open so that the lotion may be applied daily. Upon completion of the healing process within approximately 2 weeks, there is no scar formation even though the broken skin has not been drawn together during the interim.

The lotion similarly promotes scar-free healing of the skin lacerations in many forms of animal life, particularly livestock and domestic animals.

EXAMPLE 2

| | |
|---|---|
| Phenol Solution (88% phenol in water) tg | 114.0 grams |
| Olive Oil, U.S.P. | 114.0 grams |
| Fish Oil, Technical Grade | 114.0 grams |

The technical grade fish oil is an especially rich and economical source of retinol and ergosterol. Each gram contains approximately 850 U.S.P. Units of Vitamin "A" and 85 U.S.P. Units of Vitamin "D."

The healing lotion of the present Example performs in analogous fashion to the formulation of Example 1. Examples 1 and 2 provide especially rapid regenerative scar-free healing of skin lacerations.

EXAMPLE 3

| | |
|---|---|
| Phenol Solution (88% phenol in water) | 113.7 grams |
| Olive Oil, U.S.P. | 114.0 grams |
| Retinol (Vitamin A) | 88,000 U.S.P. Units |
| Ergosterol (Vitamin D) | 8,540 U.S.P. Units |
| Oleaginous diluent as castor oil | 190.0 grams |

EXAMPLE 4

| | |
|---|---|
| Cresol tg 100.0 grams | |
| Olive Oil, U.S.P. | 130.0 grams |
| Retinol (Vitamin A) | 105,000 U.S.P. Units |
| Ergosterol (Vitamin D) | 11,180 U.S.P. Units |
| Oleaginous diluent as Petrolatum tg 135.0 grams | |

EXAMPLE 5

| | |
|---|---|
| Resorcinol | 100.0 grams |
| Olive Oil, U.S.P. | 190.0 grams |
| Retinol (Vitamin A) | 83,500 U.S.P. Units |
| Ergosterol (Vitamin D) | 7,600 U.S.P. Units |
| Oleaginous diluent as animal fat | 32.0 grams |

EXAMPLE 6

| | |
|---|---|
| Phenol (Anhydrous) | 100.0 grams |
| Olive Oil, U.S.P. | 158.0 grams |
| Retinol (Vitamin A) | 116,000 U.S.P. Units |
| Ergosterol (Vitamin D) | 12,900 U.S.P Units |

EXAMPLE 7

| | |
|---|---|
| Phenol Solution (88% phenol in water) | 114.0 grams |
| Olive Oil, U.S.P. | 100.0 grams |
| Retinol (Vitamin A) | 93,000 U.S.P. Units |
| Ergosterol (Vitamin D) | 11,600 U.S.P. Units |
| Oleaginous diluent as linseed oil | 182.0 grams |

EXAMPLE 8

| | |
|---|---|
| Biphenol | 100.0 grams |
| Olive Oil, U.S.P. | 150.0 grams |
| Retinol (Vitamin A) | 92,000 U.S.P. Units |
| Ergosterol (Vitamin D) | 9,200 U.S.P. Units |
| Oleaginous diluent as castor oil | 60.0 grams |

Each of the preceding six examples performs in analogous fashion to Examples 1 and 2. Each formulation is useful to promote scar-free and rapid healing of skin lacerations in many forms of vertebrate animal Specifically specifically, deep gashes in horses, cows, and swine have been so successfully treated.

Surprisingly, scar-free healing has resulted, even without sutures, for extremely deep and wide lacerations that traditionally require four or more stitches. In one case, a horse had a gash so deep on the stifle that the muscle was exposed; even without sutures, scar-free healing resulted following repeated application of the abluent medicament. Further, the application of the abluent medicament of the present invention may be commenced as late as about 48 hours after the original injury; the lotion does provide scar-free healing even for such semihealed lacerations.

While the above invention has been described with reference to specific examples, it is to be understood that the invention is not intended to be limited to these examples, except as recited hereinafter in the appended claims.

What is claimed as novel is as follows: lacerating:

1. The method of promoting rapid and scar-free healing of a skin laceration, said method comprising the daily application of the following homogeneous mixture to a skin laceration: 100 parts by weight of phenol: about 80,000 U.S.P. Units of retinol; about 8,000 U.S.P. Units of ergosterol; and about 114 parts by weight olive oil.

2. The method of claim 1 wherein the homogenous mixture comprises about ⅓ parts by weight of an 88 percent solution of phenol in water; about ⅓ parts by weight of olive oil; and about ⅓ parts by weight of technical grade fish oil.

* * * * *